United States Patent
Salentijn et al.

(10) Patent No.: US 11,273,441 B2
(45) Date of Patent: Mar. 15, 2022

(54) SENSOR CARTRIDGE FOR CHEMICAL ASSAYS OF A LIQUID SAMPLE CONTAINING ANALYTE MOLECULES

(71) Applicant: Rijksuniversiteit Groningen, Groningen (NL)

(72) Inventors: Gert Ijsbrand Salentijn, Utrecht (NL); Marten Herre Hoekstra, Groningen (NL)

(73) Assignee: Rijksuniversiteit Groningen, Groningen (NL)

(*) Notice: Subject to any disclaimer, the term of this patent is extended or adjusted under 35 U.S.C. 154(b) by 73 days.

(21) Appl. No.: 16/620,212

(22) PCT Filed: Jun. 7, 2018

(86) PCT No.: PCT/NL2018/050369
§ 371 (c)(1),
(2) Date: Dec. 6, 2019

(87) PCT Pub. No.: WO2018/226097
PCT Pub. Date: Dec. 13, 2018

(65) Prior Publication Data
US 2021/0077994 A1 Mar. 18, 2021

(30) Foreign Application Priority Data
Jun. 8, 2017 (EP) .................................... 17175081

(51) Int. Cl.
*B01L 3/00* (2006.01)
*G01N 1/40* (2006.01)

(52) U.S. Cl.
CPC .......... *B01L 3/5023* (2013.01); *G01N 1/4022* (2013.01); *B01L 2200/0678* (2013.01);
(Continued)

(58) Field of Classification Search
CPC .......... B01L 3/5023; B01L 2200/0678; B01L 2200/0689; B01L 2200/10; B01L 2200/16;
(Continued)

(56) References Cited

U.S. PATENT DOCUMENTS 5,545,376 A 8/1996 Honigs et al.
5,900,405 A 5/1999 Urry
(Continued)

OTHER PUBLICATIONS

Won et al. A New Cloning Method for the Preparation Repetitive Polypeptides without a Sequence Requirement, Macromolecules, 2002. vol. 35, pp. 8281-8287.
(Continued)

*Primary Examiner* — Matthew D Krcha
*Assistant Examiner* — Sophia Y Lyle
(74) *Attorney, Agent, or Firm* — Banner & Witcoff, Ltd.

(57) ABSTRACT

A sensor cartridge contains a porous matrix for passing analyte molecules of a liquid sample. A porous collection disk supports the matrix and closes a lower end of a wall of the cartridge. The collection disk being sandwiched between the lower end and a base cap. An air channel extends between a first air opening at a top end of the cartridge and a second air opening positioned above the collection disk and opposite a base cap air opening. The collection disk is between the second air opening and the base cap air opening. At least one of the first air openings and the base cap air opening comprises a connection to a supra-atmospheric or subatmospheric pressure air source. The second air opening and the base cap air opening guide an air flow to provide evaporation and analyze concentration at specific locations of the collection disk, thereby improving detection limits.

13 Claims, 3 Drawing Sheets

(52) U.S. Cl.
CPC ... *B01L 2200/0689* (2013.01); *B01L 2200/10* (2013.01); *B01L 2200/16* (2013.01); *B01L 2300/042* (2013.01); *B01L 2300/126* (2013.01); *G01N 2001/4027* (2013.01)

(58) Field of Classification Search
CPC ......... B01L 2300/042; B01L 2300/126; B01L 2200/028; B01L 2300/069; B01L 2400/0406; B01L 2400/0487; G01N 1/4022; G01N 2001/4027
See application file for complete search history.

(56) References Cited

U.S. PATENT DOCUMENTS

| | | | |
|---|---|---|---|
| 5,928,951 A * | 7/1999 | Seshimoto | G01N 33/525 436/46 |
| 5,979,516 A * | 11/1999 | Grant | F01M 11/0408 141/114 |
| 6,620,620 B1 | 9/2003 | Anderson et al. | |
| 2002/0068304 A1 | 6/2002 | Urry | |
| 2003/0203506 A1 | 10/2003 | Beebe | |
| 2004/0110439 A1 | 6/2004 | Chaikof et al. | |
| 2010/0202929 A1 * | 8/2010 | Renslow | B01L 3/50825 422/513 |
| 2012/0118051 A1 * | 5/2012 | Raadnui | G01N 15/0272 73/61.71 |
| 2015/0293011 A1 | 10/2015 | Chen et al. | |
| 2016/0045148 A1 * | 2/2016 | Al-Uzri | A61B 5/150358 600/583 |
| 2016/0223442 A1 * | 8/2016 | Guldberg | A61B 10/0096 |

OTHER PUBLICATIONS

Pesce et al., Enhancing cellular uptake of GFP via unfolded supercharged protein tags. Biomaterials, Jun. 2013, vol. 34, pp. 4360-4367.

Jul. 19, 2018, International Search Report and Written Opinion, PCT/NL2018/050369.

* cited by examiner

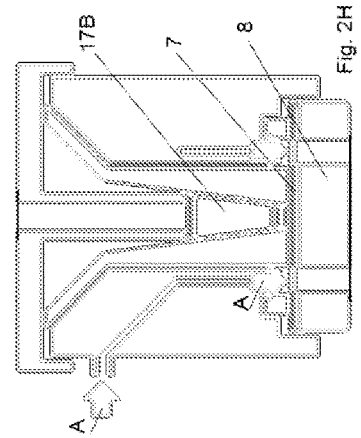
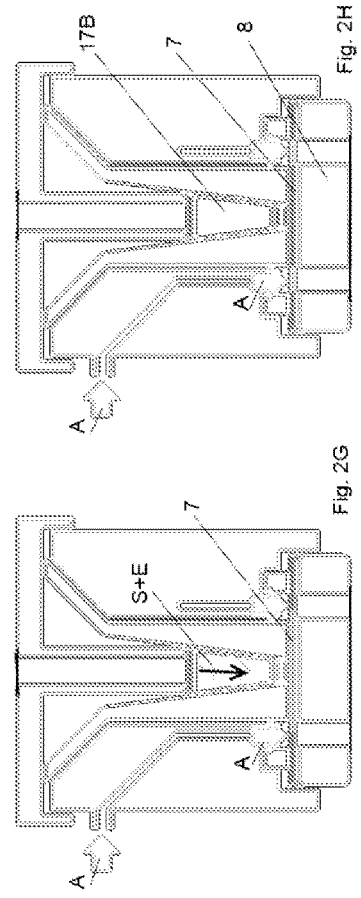
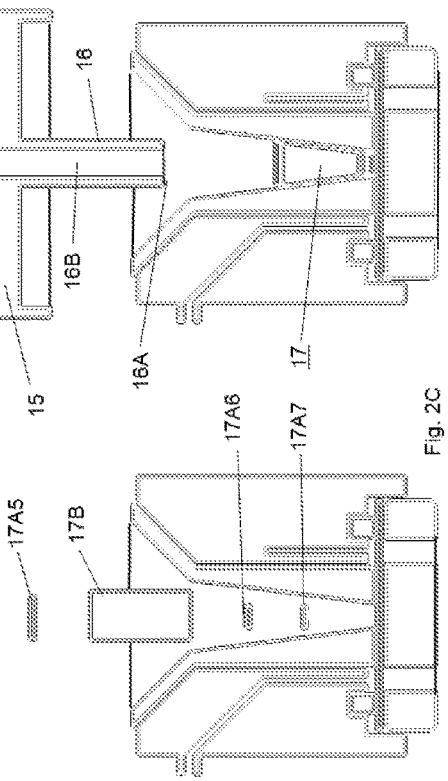
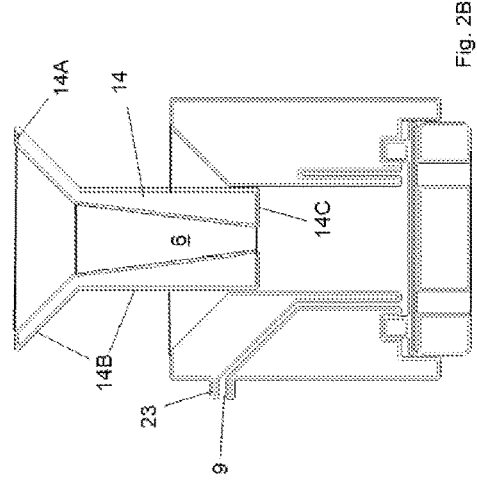
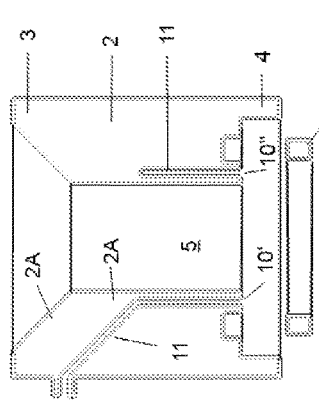
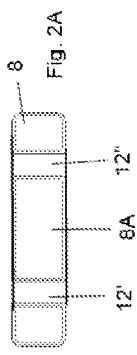
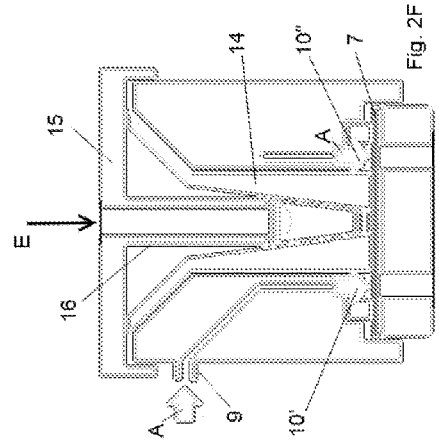
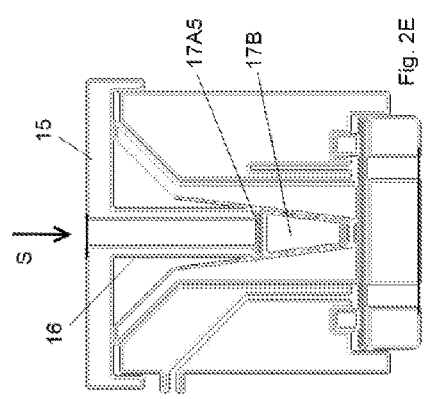

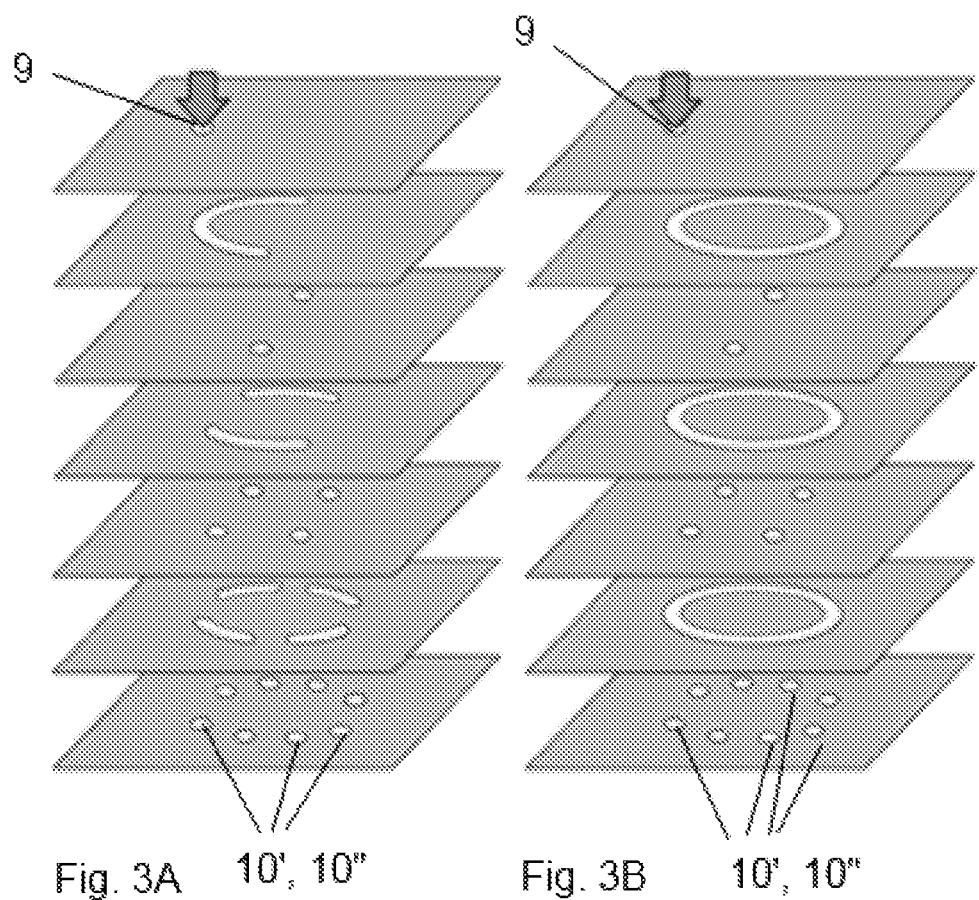
Fig. 3A  10', 10"   Fig. 3B  10', 10"

SENSOR CARTRIDGE FOR CHEMICAL ASSAYS OF A LIQUID SAMPLE CONTAINING ANALYTE MOLECULES

CROSS-REFERENCE TO RELATED APPLICATIONS

This application is a U.S. National Stage application under 35 U.S.C. § 371 of International Application PCT/NL2018/050369 (published as WO 2018/226097 A8), filed Jun. 7, 2018, which claims the benefit of priority to Application EP 17175081.3, filed Jun. 8, 2017. Benefit of the filing date of these prior applications is hereby claimed. Each of these prior applications is hereby incorporated by reference in its entirety.

BACKGROUND OF THE INVENTION

The invention in general relates to a sensor for chemical assays of a liquid sample containing analyte molecules.

Such a sensor is for example known from US-A1-2015/0293011. This known sensor device comprises a mixing portion configured to receive and mix a first liquid solution of unknown composition with a second liquid solution comprising a suspended particle resulting in a mixed liquid solution. The known device further comprises a surface of a solid, non-porous substrate which is configured to receive and evaporate a drop of the mixed liquid solution. Evaporation of the drop in connection with a capillary flow of the mixed liquid solution disperses the suspended particle in a ring pattern based on at least one property of the suspended particle defined in relation to a presence of the analyte or an absence of the analyte in the first liquid solution. The known sensor device further comprises a processing device which is configured to inspect image data, received from an imaging element and representing the ring pattern information, and thus it is possible to detect the presence of the analyte or the absence of the analyte in the first liquid solution based on at least one property of the ring pattern information.

In order to provide correct measurement results the known sensor device requires a mixing device, e.g. a centrifuge component, to properly mix the first and second liquid solutions, which makes this sensor device less suitable for usage in the field. In addition, low concentrations of analyte in the drop after evaporation on the non-porous substrate often give a signal which is below the level that can be detected by the processing device. In case several drops are supplied simultaneously this only results in a larger ring pattern, but does not lead to an increased concentration of the analyte because the analyte is spread over a larger ring pattern surface. Repeating the application—drying cycle with single drops a number of times might lead to an increased concentration of the analyte but is more laborious and time consuming and will likely lead to distortion of the ring pattern, thereby impairing proper analysis.

OBJECTS OF THE INVENTION

It is thus an object of the present invention to provide a sensor device which is highly suitable for usage in the field and which sensor device has an improved limit of detection, so that it is possible to measure low concentrations of analyte in a liquid sample.

SUMMARY OF THE INVENTION

The above objects can be achieved in accordance with the invention by providing a sensor cartridge for chemical assays of a liquid sample containing analyte molecules, said sensor cartridge comprising:

a wall having an open top end and a lower end, said wall enclosing a space for containing porous matrix, said open top end being configured for supplying liquid sample containing analyte molecules to the space;

a porous collection disk closing the lower end of the wall, said porous collection disk being arranged for supporting and contacting porous matrix;

wherein the space contains porous matrix, said porous matrix being configured for passing analyte molecules of a liquid sample therethrough and said porous matrix contacting the porous collection disk;

a base cap attached to the lower end of the wall, said porous collection disk being sandwiched between the lower end of the wall and the base cap;

an air channel extending between a first air opening positioned at the top end thereof the wall and a second air opening positioned at a distance above the porous collection disk;

said base cap comprising a base cap air opening positioned opposite the second air opening, said porous collection disk being positioned between the second air opening and the base cap air opening;

wherein at least one of the first air opening and the base cap air opening comprises an air source connection for connecting the cartridge to a source of air under supra-atmospheric pressure or a source of subatmospheric pressure;

said second air opening (10', 10") and the base cap air opening (12', 12") being arranged to guide an air flow to specific locations of the porous collection disk (7) for providing localized evaporation and analyte concentration.

By using a porous collection disk which is positioned between the second air opening and the base cap air opening and by using an air flow from the first air opening to the second air opening and through the porous collection disk to the base cap air opening (or depending on the direction of the air pressure drop vice versa) the sensor cartridge allows for active local enhancement of evaporation in specific locations or spots of the porous collection disk for concentrating an analyte in solution, as a result of which detection limits are improved. An air flow can for example be directed via the second air opening to specific locations above the porous collection disk, where it facilitates solvent evaporation and thereby induces solvent flow to those specific regions, which results in active and localized evaporation. In addition the active, localized air-flow even increases the rate of evaporation which allows results to be obtained in a short time period. In this way the specific regions which are dried act as a capillary "engine" to continuously pull analyte molecules dissolved in a solvent towards this region, thereby effectively concentrating them. In case more liquid sample is supplied to the sensor cartridge evaporation of the liquid sample on the porous collection disk is confined to the same ring pattern of the liquid sample previously supplied, which strongly increases the concentration of the analyte in the ring pattern. In this manner a previously undetectable signal is now detectable by the disclosed sensor cartridge. In addition, due to its cartridge design the sensor cartridge is extremely suitable for use in the field and because by using the sensor cartridge the analytes are not only concentrated in the porous collection disk but are also stored in the sensor cartridge in a concentrated ring pattern, so that the sensor cartridge can be used at a later time to perform the actual measurement, although measurements on site are also possible. The above makes the disclosed sensor cartridge suitable for a variety of environmental testing; medical tests;

field tests; tests in low resource settings. The sensor cartridge can thus be applied in environmental science, in healthcare, in animal health care and diagnostics, agriculture, food and beverage industry, in forensics, field-testing and might of course also be applied in a more conventional laboratory setting.

In a sensor cartridge according to the invention it is possible to choose and use a specific porous matrix to make the sensor cartridge suitable for detecting any desired analyte.

In a preferred embodiment the wall is cylindrical in cross-section, but in other embodiments the cross-section of the wall can by conical or any other type of spherical cross-section having a varying diameter. In addition, in other embodiments the wall can have a non-spherical cross-section.

In an embodiment of the invention the air channel can be provided in a sleeve or holder surrounding the wall of the sensor cartridge. In an alternative embodiment of a sensor cartridge according to the invention the air channel is embedded in the wall itself. In this manner no separate sleeve or holder with an air channel is required and a compact design of the sensor cartridge can be obtained.

It is beneficial when the second air opening comprises a plurality of secondary air orifices, wherein the air channel forms an air distribution network connecting the first air opening to each of the plurality of secondary air orifices, and wherein the base cap air opening comprises a plurality of base cap air orifices, each base cap air orifice positioned opposite a respective secondary air orifice. Furthermore, the specific site of release of air over the porous collection disk can be chosen by the layout of the air distribution network. In this manner not only the concentration and directional transportation of liquid sample is enforced, but also by design it can be controlled to where liquid sample is transported. Preferably, the secondary air orifices and the base cap air orifices are uniformly distributed. In this manner it is possible to obtain a uniform, active air flow around the porous collection disk, which is beneficial in obtaining a ring pattern in the porous collection disk with a uniform, increased concentration of analyte. Please note, that such a ring pattern need not necessarily by circular, and that by the pattern can have different shapes depending on the actual distribution of the secondary air orifices and the base cap air orifices. The integration of the air distribution network or manifold, preferably in the wall of the sensor cartridge, ensures that an air flow can be applied uniformly to the porous collection disk to enhance evaporation. The regions of the porous collection disk dried in this way can act as a capillary "engine" to continuously pull analyte molecules dissolved in a solvent towards this region, thereby effectively concentrating them.

In a further embodiment of a sensor cartridge according to the invention the sensor cartridge comprises a sealing element positioned between the lower end of the wall and the porous collection disk, said sealing element surrounding the second air opening. By using a sealing element, such as e.g. an O-ring, possible leakage of air can be avoided.

In an advantageous embodiment of a sensor cartridge according to the invention the sensor cartridge further comprises a flexible funnel and a top cap, said wall having an inner wall surface, said flexible funnel having an outer funnel surface, said flexible funnel fitting into the wall, said inner wall surface being in contact with said outer funnel surface, said flexible funnel having a funnel space containing the porous matrix, and said flexible funnel being enclosed by the top cap and the wall. In particular the flexible funnel comprises a top end and a lower end, wherein the diameter of space decreases from the top end towards the lower end. Preferably the top cap comprises a sleeve extending into the space of the flexible funnel, said sleeve having a lower end arranged for contacting the porous matrix and a sleeve channel arranged for supplying liquid sample containing analyte molecules to the space. By using such a top cap and flexible funnel samples and eluent can be easily supplied to porous eluent material provide in the funnel space, and in addition the sleeve of the top cap can exert a desired pressure on the porous eluent material to provide a stable stack of eluent material. In addition, the top cap, when connected to the wall can exert a pressure on the flexible funnel which provides a tight seal on the porous collection disk.

In a further embodiment of a sensor cartridge according to the invention the base cap has a portion comprising transparent material for allowing inspection of the porous collection disk. It has appeared that the bottom or lower side of the porous collection disk can be used for quantification, despite the fact that it gives a lower signal and sensitivity. The porous collection disk of the disclosed sensor cartridge thus need not be removed from the rest of the cartridge in order to perform measurements on the porous collection disk. Please note that in other embodiments optical detection can e.g. be performed through holes in the bottom cap or from above (e.g. after removal of the porous collection disk). The porous collection disc can be made of paper, which is a very common and cheap material, can easily be shaped into a desired format, and can easily be transported and stored.

Preferably the porous matrix comprises one or more of at least one porous disk and a powdered (or porous) material. Depending on the analyte to be detected a powdered (or porous) material having a density can be chosen to adapt the flow rate. In this manner the space can be for example loaded with pre-fabricated (low risk of contamination) paper disks, polymer beads possible loaded with antibodies, solid powders (such as cellulose, silica or even metallic) as powdered (or porous) material for eluting molecules therethrough. The materials and densities etc. can be selected and fine-tuned for detection of almost any type of molecule and in addition the air pressure applied to the porous collection disk can be fine-tuned depending on the analyte to be detected. Cellulose may be used, for instance, to keep possible reagents in different paper disks from contacting each other, as well as to provide more precise control over solvent delivery flow rates. The powdered (or porous) material can also contain material of a metallic nature, such as zinc, which may be used to electrochemically reduce certain analytes.

In a still further embodiment of a sensor cartridge according to the invention the sensor cartridge comprises a source of air under supra-atmospheric pressure or a source of subatmospheric pressure, which source is connected or connectable to the air source connection. As such a source e.g. disposable compressed air canisters or manually operable/inflatable pressure balloons can be envisaged to supply the air for drying the porous collection disk, making device operation easier in a location remote from a laboratory.

BRIEF DESCRIPTION OF THE DRAWINGS

The embodiments herein will be described and explained with additional specificity and detail through the use of the accompanying drawings in which:

FIGS. 2A to D show the assembly of a second embodiment of a sensor cartridge according to the invention in cross section in various stages of assembly, and FIGS. 2E-2H depict the various stages of usage of the sensor cartridge according to the second embodiment; and FIGS. 3A and 3B schematically show sliced representations of an embodiment of an air distribution network in the wall of a sensor cartridge according to the invention.

DETAILED DESCRIPTION OF EXEMPLARY EMBODIMENTS

Figure 1:
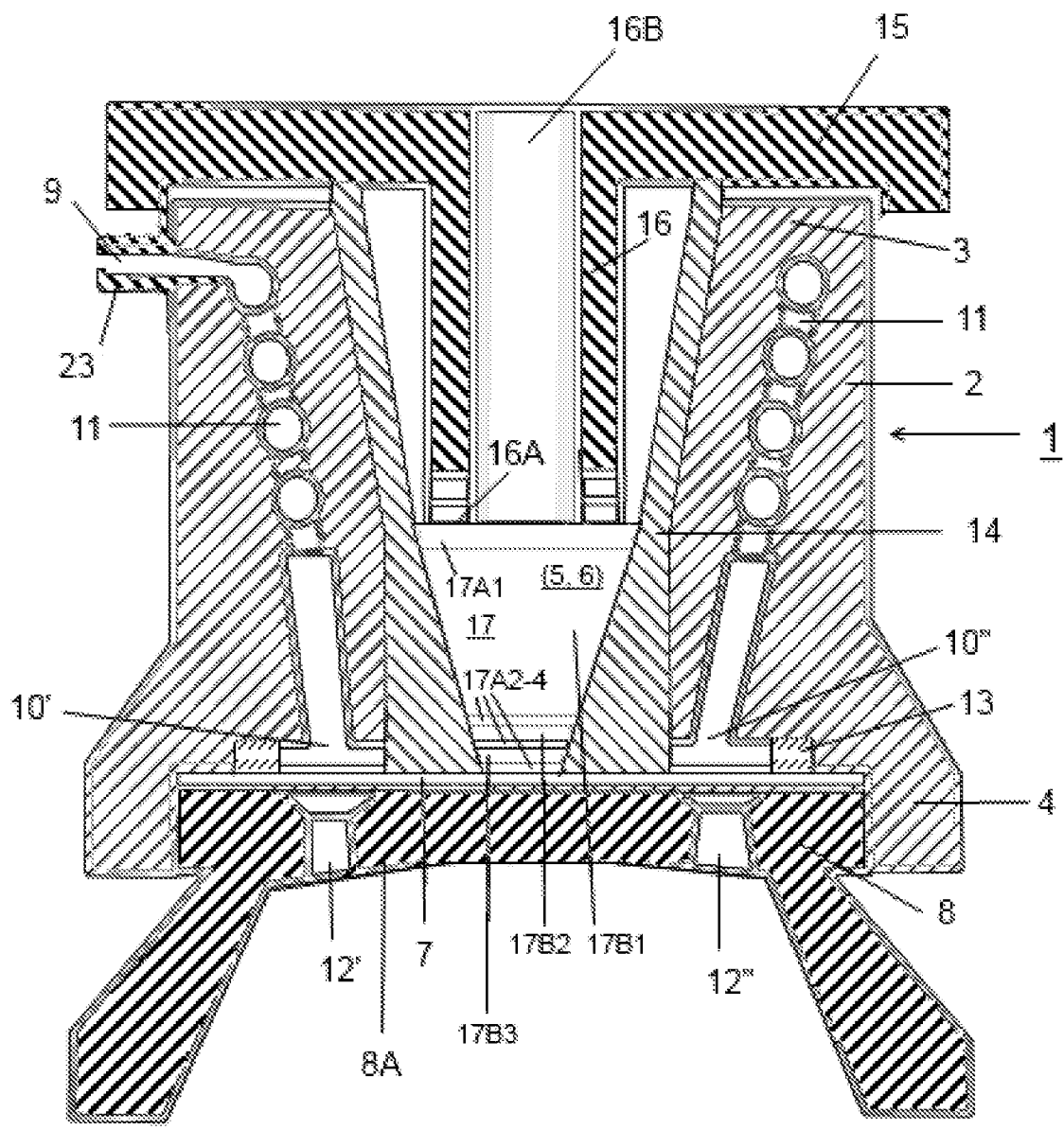
FIG. 1 shows a first embodiment of a sensor cartridge according to the invention in cross section.

By way of example the invention will be described with reference to FIG. 1 in which a first embodiment of a sensor cartridge 1 according to the invention is shown in cross section. This sensor cartridge 1 can be used for chemical assays of a liquid sample containing analyte molecules.

As shown in FIG. 1 the sensor cartridge 1 comprises a cylindrical wall 2, which has an open top end 3 and a lower end 4. The cylindrical wall 2 encloses a space 5, 6 for containing porous matrix 17. Please note that the invention is described by way of example with regard to a wall having a cylindrical cross-section. However, the invention is not restricted to this embodiments, and in other embodiments the cross-section of the wall can by conical or any other type of spherical cross-section having a varying diameter. In addition, in further embodiments the wall can have a non-spherical cross-section.

In the embodiment shown in FIG. 1 the porous matrix 17 is configured for passing analyte molecules of a liquid sample therethrough. In this embodiment the porous matrix 17 comprises an upper first porous disk 17A1 and three lower porous disks 17A2-17A4. Depending on the analyte to be detected, the porous disks can be impregnated or loaded with a specific reagent. In addition, the porous matrix 17 comprises a powdered (or porous) material 17B, which in this embodiment is composed of a first porous material component 17B1 positioned between the upper porous disk 17A1 and the lower porous disk 17A2 and second and third porous material 17B2, 17B3 positioned between the respective lower porous disks 17A2-17A4. The porous material components 17B2, 17B3 can keep the possible reagents in the porous disks 17A2-4 from contacting each other and provide more precise control over solvent delivery flow rates.

Please note that in other embodiments the number and arrangement of porous disks 17A and the number and arrangement of porous material components 17B can differ in dependence of the analyte molecule to be detected.

In the embodiment shown in FIG. 1 the porous material 17B1 has a density such that the flow rate is fine tuned for the specific analyte to be detected.

In the embodiment shown in FIG. 1 the porous disks 17A1-A4 are paper disks and the porous material comprises cellulose. Please note however, that the material of the porous components can be selected and fine-tuned for detection of almost any type of molecule. For example, polymer beads possibly loaded with antibodies or other solid powders for the powdered (or porous) material, such as silica or a component of a metallic nature, such as zinc, may be used in a sensor cartridge according to the invention, e.g. to electrochemically reduce certain analytes.

The sensor cartridge 1 shown in FIG. 1 further comprises an open top end 3, which is configured such that a liquid sample containing analyte molecules can be supplied to the space 5, 6. The lower end 4 of the cylindrical wall 2 is closed by the porous collection disk 7, which supports and contacts the porous matrix 17. In the embodiment of the sensor cartridge 1 shown in FIG. 1 the porous collection disc 7 is made of paper, although other porous materials can be used in other embodiments.

A base cap 8 is attached to the lower end 4 of the cylindrical wall 2 such that the porous collection disk 7 is sandwiched between the lower end 4 of the cylindrical wall 2 and the base cap 8.

The cylindrical wall 2 further comprises a first air opening 9 positioned at the top end 3 of the cylindrical wall 2. A second air opening composed of several secondary air orifices 10', 10" is positioned at a distance above the porous collection disk 7 and these secondary air orifices 10', 10" are connect to the first air opening 9 via an air channel 11, which in the embodiment shown in FIG. 1 is embedded in the cylindrical wall 2. Please note that although the invention is described in detail with reference to a sensor cartridge in which the air channel is embedded in the wall of the sensor cartridge, the invention also relates to embodiments in which the air channel is provided in or on e.g. a separate sleeve or holder surrounding the wall of the sensor cartridge.

The air channel 11 in this embodiment forms an air distribution network connecting the first air opening 9 to each of the plurality of secondary air orifices 10', 10". Two embodiments of such an air distribution network are schematically shown in FIGS. 3A, 3B, which Figures show several discrete sections through the cylindrical wall which provide an indication of the bifurcation of the air channel going from the first air opening 9 to the secondary air orifices 10', 10". As shown in FIGS. 3A, 3B the secondary air orifices 10', 10" and consequently also base cap air orifices, to be discussed later, are uniformly distributed. Please note that the invention is not restricted to the embodiments shown in FIGS. 3A, 3B but that the air distribution network in other embodiments can have a different configuration depending on e.g. the analyte to be detected. In order to manufacture a cylindrical wall with an integrated air distribution network, it is beneficial to use a 3D-printing process. Such a 3D-printing process can also be used to manufacture other components of the sensor cartridge 1, such as the top cap and the base cap. The invention is, however, not restricted to a 3D-manufactured sensor cartridge. The disclosed sensor cartridge can also be manufactured by any other known manufacturing process.

As shown in FIG. 1 the base cap 8 has base cap air orifices 12', 12" (together forming a base cap air opening) which are positioned opposite respective secondary air orifices 10', 10" of the cylindrical wall 2. In the embodiment shown in FIG. 1 the first air opening 9 of the cylindrical wall comprises an air source connection 23 for connecting the sensor cartridge 1 to a source of air under supra-atmospheric pressure. As such a source e.g. disposable compressed air canisters or manually operable/inflatable pressure balloons can be used. Since the porous collection disk 7 is positioned between the secondary air orifices 10', 10" of the cylindrical wall 2 and the base cap air openings 12', 12", an air flow can be generated by the source of air under supra-atmospheric pressure such that the air flow passes from the first air opening 9 to the respective secondary air orifices 10', 10", through specific locations of the porous collection disk 7 positioned below the respective secondary air orifices 10', 10" and through the base cap 8 via the base cap air orifices 12', 12". It is observed here that the invention is not restricted to the embodiment shown in FIG. 1 and that in other embodiments it is the base cap air opening 12', 12" that comprises an air source connection 23 and that instead of a source of air under supra-atmospheric pressure a source of subatmospheric pressure can be used.

In the embodiment of the sensor cartridge 1 shown in FIG. 1 a sealing element, in this example an O-ring 13 is positioned between the lower end 4 of the cylindrical wall 2 and the porous collection disk 7 for providing a seal to prevent air leakage. The sealing element 13 surrounds the secondary air orifices 10', 10".

The sensor cartridge 1 of FIG. 1 further comprises a flexible funnel 14 and a top cap 15. The flexible funnel 14 has an outer funnel surface 14B (FIG. 2) and fits into the cylindrical wall 2 such that the inner wall surface 2A of the cylindrical wall 2 is in contact with the outer funnel surface 14B for amongst other things providing a correct seal against air leakage. The flexible funnel 14 thus occupies a portion of the space 5 surrounded by the cylindrical wall 2 and is enclosed by the top cap 15 and the cylindrical wall 2. As is shown in FIG. 1 the flexible funnel 14 comprises a funnel space 6 which contains the porous matrix 17. The flexible funnel 14 has a top end 14A and a lower end 14C (FIG. 2) and, in the shown embodiment, the diameter of the space 6 decreases from the top end 14A towards the lower end 14C.

The top cap 15 has a sleeve 16 extending into the space 6 of the flexible funnel 14. The lower end 16A of the sleeve 16 is arranged for contacting the porous matrix 17. A sleeve channel 16B is provided in the sleeve 16 such that a liquid sample containing analyte molecules can be supplied to the porous matrix 17 in the space 5, 6.

The base cap 8 might be, but not necessarily, partially or entirely be made of transparent material 8A for allowing inspection of the porous collection disk 7. It has appeared that the bottom or lower side of the porous collection disk 7 can be used for quantification, despite the fact that it gives a lower signal and sensitivity, and that in case the base cap is transparent measurements can be performed on the porous collection disk, e.g. using photographic equipment, or other methods of measurement such as optical methods using e.g. absorbance or fluorescence, electrochemical methods, (electro-) chemiluminescence, or colorimetric detection methods without having to remove the porous collection disk from the sensor cartridge.

In FIGS. 2A-2D it is schematically shown how a second embodiment of the sensor cartridge 1 is assembled, while in FIGS. 2E-2H it is schematically shown how the sensor cartridge 1 is used. The difference between the sensor cartridge shown in FIG. 2 with the sensor cartridge shown in FIG. 1 can be found in the shape of the cylindrical wall and the base cap design, and the composition of the porous matrix, which in the embodiment shown in FIG. 2 is composed (from top to bottom) of a top paper disk 17A5, a cellulose material 17B, and two lower paper disks 17A6 and 17A7. Please note that for both embodiments the same reference numerals are used to indicate corresponding components.

As shown in FIGS. 2A-2B the first air opening 9 to concentrate or evaporate liquid sample is positioned at the top end of the cylindrical wall 2. The porous collection disk 7 is placed in this cylindrical wall 2, which is sealed from below by the base cap. An O-ring 13 of any suitable flexible or rubbery material is placed in between the cylindrical wall 2 and the base cap 8 to produce an air-tight seal. Next, a funnel 14 of any suitable flexible or rubbery material is inserted into the cylindrical wall 2 from above, and loaded with pre-fabricated paper disks 17A5-A7 and cellulose powder 17B as indicated in FIG. 2C. As shown in FIG. 2 the funnel 14 is shaped like a cone, pointing downwards. In this embodiment the funnel 14 is conical, which leads to convergence of eluting sample before entering the porous collection disk 7. Finally, as shown in FIG. 2D the top cap 15 with a downward protruding, hollow sleeve 16 is inserted into the funnel 14. The lower end 16A of the sleeve 16 pushes down onto the paper disk 17A5 and the cellulose powder 17B, such that the contents of the funnel space 5, i.e. the eluent material 17, is compressed. The top cap 15 also presses the flexible funnel 14 onto the porous collection disk 7 to seal the interface against air leakage. Please note that attachment of the top cap and base cap to the cylindrical wall can be e.g. achieved by screw threads, a bayonet connection or any other known manner. In this manner at least some components of the sensor cartridge can be detached from each other for possible reuse. However, it is also possible that the connection of the components is a permanent connection, such as by heat sealing, and that the sensor cartridge is used as a single use unit.

In the embodiment shown in FIG. 2 the cylindrical wall 2, and the funnel and O-ring 14, 13 are manufactured by 3D-printing and are introduced to seal off the interface between the collection disk 7 and the air distribution network 11 in order to prevent air from escaping. In the shown embodiment the base cap 8 is made from more rigid PLA and such that it has a smooth surface for the sealing interface with the porous collection disk 7.

As shown in FIGS. 2E-2H a liquid sample S (e.g. having a volume of 10-100 μL) is introduced into the sensor cartridge by inserting a micropipette into the sleeve 16 and depositing the liquid sample S via a single application (or in several aliquots) directly onto the top paper disk 17A5 (FIG. 2E). The liquid sample S enters into the porous cellulose column 17B and is subsequently eluted with a solvent E (FIG. 2F) without waiting for the sample S to dry. Please note that in other embodiments the sample can also be dried or stored first. Solvent S for elution towards the collection disk 7 is added through the sleeve 16 in the top cap 15. Air pressure A is applied to the air inlet opening 9, such that an air flow A is be directed via the second air openings 10', 10" to specific locations of the porous collection disk 7, where the active air flow A facilitates solvent evaporation and thereby induces solvent flow to those specific regions, which results in active and localized evaporation, thereby effectively causing the analyte of interest to concentrate in a ring around the funnel 14 on the collection disk (FIG. 2G).

Finally (FIG. 2H) the analytes are confined to a ring on the porous collection disk 7 around the cellulose column, having a diameter which is about the same as the distance between opposing secondary air orifices 10', 10". Since the sensor cartridge can in fact capture analyte molecules in a ring-shaped area of a specific predetermined dimension, increasing the volume leads to the capture of more analyte molecules in this same area, thus providing higher signal intensity. In case the base cap 8 is partially or entirely made of transparent material the bottom or lower side of the porous collection disk 7 can be inspected for quantification, e.g. using photographic equipment. In other embodiments it is possible to remove the porous collection disk from the sensor cartridge and to perform measurements and/or analysis in any other suitable known manner.

The invention claimed is:

1. A sensor cartridge for chemical assays of a liquid sample containing analyte molecules, said sensor cartridge comprising:
   a wall having an open top end and a lower end, said wall enclosing a space for containing porous matrix, said open top end being configured to comprise a liquid sample supply channel arranged for supplying liquid sample containing analyte molecules to the space;

a porous collection disk closing the lower end of the wall, said porous collection disk being arranged for supporting and contacting porous matrix;

wherein the space contains porous matrix, said porous matrix being configured for passing analyte molecules of a liquid sample therethrough and said porous matrix contacting the porous collection disk;

a base cap attached to the lower end of the wall, said porous collection disk being sandwiched between the lower end of the wall and the base cap;

an air channel extending between a first air opening positioned at the open top end of the wall and a second air opening positioned at a distance above the porous collection disk, the air channel being separate from the liquid sample supply channel;

said base cap comprising a base cap air opening positioned opposite the second air opening, said porous collection disk being positioned between the second air opening and the base cap air opening;

wherein at least one of the first air opening and the base cap air opening comprises an air source connection for connecting the cartridge to a source of air under supra-atmospheric pressure or a source of subatmospheric pressure;

said second air opening and the base cap air opening being arranged to guide an air flow to specific locations of the porous collection disk for providing localized evaporation and analyte concentration.

2. The sensor cartridge according to claim 1, wherein the air channel is embedded in the wall.

3. The sensor cartridge according to claim 1, wherein the second air opening comprises a plurality of secondary air orifices, wherein the air channel forms an air distribution network connecting the first air opening to each of the plurality of secondary air orifices, and wherein the base cap air opening comprises a plurality of base cap air orifices, each base cap air orifice positioned opposite a respective secondary air orifice.

4. The sensor cartridge according to claim 3, wherein the secondary air orifices and the base cap air orifices are uniformly distributed.

5. The sensor cartridge according to claim 1, wherein the sensor cartridge comprises a sealing element positioned between the lower end of the wall and the porous collection disk, said sealing element surrounding the second air opening.

6. The sensor cartridge according to claim 1, wherein the sensor cartridge comprises a flexible funnel and a top cap, said wall having an inner wall surface, said flexible funnel having an outer funnel surface, said flexible funnel fitting into the wall, said inner wall surface being in contact with said outer funnel surface, said flexible funnel having a funnel space for containing porous matrix, and said flexible funnel being enclosed by the top cap and the wall.

7. The sensor cartridge according to claim 6, wherein the flexible funnel comprises a top end and a lower end, wherein the diameter of space decreases from the top end towards the lower end.

8. The sensor cartridge according to claim 6, wherein the top cap comprises a sleeve extending into the space of the flexible funnel, said sleeve having a lower end arranged for contacting porous matrix and a sleeve channel arranged for supplying liquid sample containing analyte molecules to the space.

9. The sensor cartridge according to claim 1, wherein the base cap has a portion comprising transparent material for allowing inspection of the porous collection disk.

10. The sensor cartridge according to claim 1, wherein the porous collection disc is made of paper.

11. The sensor cartridge according to claim 1, wherein the porous matrix comprises one or more of at least one porous disk and a powdered or porous material.

12. The sensor cartridge according to claim 11, wherein the at least one porous disk is loaded with reagent.

13. The sensor cartridge according to claim 1, wherein the sensor cartridge comprises a source of air under supra-atmospheric pressure or a source of subatmospheric pressure, which source is connected or connectable to the air source connection.

* * * * *